United States Patent [19]

Kugler et al.

[11] 4,381,996
[45] May 3, 1983

[54] METHOD AND DEVICE FOR CLEANING LIVESTOCK DIPPING VAT SOLUTION TO BE USED IN CONJUNCTION WITH A DIPPING VAT

[76] Inventors: Lane N. Kugler; H. Dale Kugler, both of Rte. 2, Box 118, Cozad, Dawson County, Nebr. 69130

[21] Appl. No.: 326,727

[22] Filed: Dec. 2, 1981

Related U.S. Application Data

[63] Continuation of Ser. No. 140,046, Apr. 14, 1980, abandoned.

[51] Int. Cl.³ .................... B01D 21/24; B01D 35/28
[52] U.S. Cl. ........................... 210/195.1; 210/196; 210/255; 210/519; 210/532.1; 119/158
[58] Field of Search ................... 210/800–803, 210/805, 806, 255, 298, 320, 456, 519, 532.1, 196, 195.1, 252, 258; 119/158

[56] References Cited

U.S. PATENT DOCUMENTS

| | | | |
|---|---|---|---|
| 225,086 | 3/1882 | Redmond | 210/320 |
| 953,377 | 3/1910 | Copeland | 210/301 |
| 1,644,532 | 10/1927 | Ledyard et al. | 210/320 |
| 1,739,302 | 12/1929 | Gregorich | 210/195.1 |
| 2,852,140 | 9/1958 | MacLaren | 210/320 |
| 3,260,368 | 7/1966 | Wagner | 210/320 |
| 3,916,839 | 11/1975 | Hewes, Jr. | 119/158 |
| 3,997,445 | 12/1976 | Hannestad | 210/320 |
| 4,154,685 | 5/1979 | Marcotte | 210/255 |

Primary Examiner—Benoit Castel
Attorney, Agent, or Firm—Henderson & Sturm

[57] ABSTRACT

A device for cleaning livestock dipping solution which includes means for pumping contaminated solution from a livestock dipping vat to a tank with settling compartments, the first of which has a deflector pan into which the entering solution is directed to prevent disturbance of settled materials and the last of which comprises a pair of removable screens for trapping animal hair and removing the hair while one screen remains in place. The solution is constantly cleaned and recycled through the vat resulting in the elimination of the need to manually clean the dipping vat. Cleanout pipes in each compartment, elevating means, gravity flow, and a security cover are also provided.

4 Claims, 4 Drawing Figures

METHOD AND DEVICE FOR CLEANING LIVESTOCK DIPPING VAT SOLUTION TO BE USED IN CONJUNCTION WITH A DIPPING VAT

This application is a continuation of application Ser. No. 140,046, filed Apr. 14, 1980, now abandoned.

BACKGROUND OF THE INVENTION

This invention relates generally to methods of dealing with contaminated livestock dipping vat solutions, and particularly with a method and device for recycling such solutions in conjunction with a dipping vat while it is in use.

In the normal course of operating a cattle feedlot or other large scale livestock operations, the animals are dipped into, or caused to swim through, a large vat of liquid pesticides solution called "dipping vat solution." In time, contaminants, primarily comprised of dirt, manure, and animal hair, accumulate in the solution and render it ineffective.

To clean the vat it is necessary to first pump out the entire liquid contents when the solution has become so contaminated it no longer will function properly. The remaining solids must then be scooped into buckets and lifted from the vat. As can be appreciated this is a time consuming, distasteful job.

The usual means of dealing with the contaminated solution is to dispose of it by dumping or burying. Such means of disposal has become unacceptable in today's pollution-conscious society, in particular because government agencies have proscribed introducing some of the pesticide chemicals used in dipping vat solutions into the environment.

Some livestock operators recycle the solution after centrifuging the contaminated solution. This approach is only partially successful, not only because the equipment is expensive, complex, and made for other purposes, but also because some of the chemicals in the pesticides, being heavier than water, tend to also be removed.

SUMMARY OF THE INVENTION

The present invention comprises a tank with several compartments. Contaminated dipping vat solution is pumped from the dipping vat into the first compartment. The solution then gravity flows through the device as various contaminants are removed in the compartments. After the contaminants are removed the recycled solution is then allowed to flow back to the dipping vat for continued use. The dirt and manure components are removed by a settling process and the animal hair is removed as the solution flows through screens. The screening of the animal hair is accomplished through a pair of removable screens in order that they may be alternately removed for cleaning without interrupting the operation of the system. The movement of the solution through the compartments is by gravity flow and the cleaning of each compartment is accomplished through clean-out pipes when the system is not operating.

An object of the present invention is to provide a device for dealing with contaminated dipping vat solution in a manner which produces a substantial reduction in environment-polluting waste materials.

Another object of the invention is the provision of a device which removes contaminants from dipping vat solution so as to permit the solution to be reused.

A further object is to provide an economical and simple device for recycling dipping vat solution without removing chemicals which are heavier than water.

Still another object is to provide a device for removing contaminants from dipping vat solutions which operates without shutting down the dipping operation.

A still further object of the invention is to provide a device for removing animal hair from dipping vat solution without discontinuing operation of the contaminant removal system.

Yet further objects are to eliminate the need to shut down a dipping vat operation for cleaning and to expend valuable time and effort manually cleaning the vat.

These and other objects, advantages and novel features of the invention will become apparent from the following detailed description of the invention when considered in conjunction with the accompanying drawings.

DESCRIPTION OF THE PREFERRED EMBODIMENT

Figure 1:
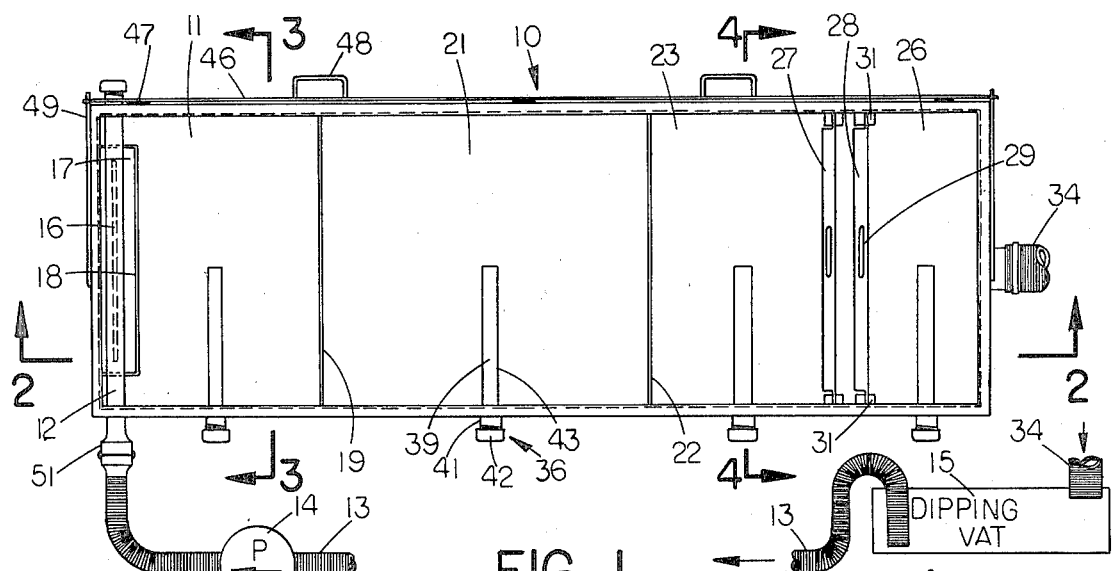
FIG. 1 is a plan view of the preferred embodiment with the cover in open position and a dipping vat shown diagramatically.

Referring now to the drawings wherein like reference numerals designate identical or corresponding parts throughout the several views, FIG. 1 shows a series of compartments within a tank, generally designated by the numeral 10, wherein contaminated dipped solution is introduced into an initial compartment 11. In this embodiment the solution is pumped into inlet pipe 12, from the dipping vat 15 through flexible suction pipe 13 by pump 14. The bottom of inlet pipe 12 is open along slot 16 (shown in cross-section in FIG. 2) in order to direct the entering solution onto deflector pan 17 so as to prevent it from striking the bottom of compartment 11 when the solution is initially introduced. Deflector pan 17 thus prevents subsequent solution from disturbing already settled residues during the early stages of operation. Even though compartment 11 has filled above the level of the top edge 18 of pan 17 and pan 17 is submerged, deflector pan 17 may still be needed due to turbulence resulting from a high rate of flow. This effect is more clearly shown in FIG. 2, where, on the left side of compartment 11, the solution is depicted below top edge 18 and on the right it is depicted flowing over divider 19 and clearly above top edge 18 as well as slot 16. From the moment solution is deposited in initial compartment 11, solids comprised essentially of dirt and manure begin to settle on its bottom and when it is full enough for the solution to spill over divider 19 into intermediate compartment 21 the solution near the top of divider 19 is somewhat free of contaminants.

Intermediate compartment 21 is somewhat larger in this embodiment and therefore is where most of the settling takes place. As can be appreciated, each time the solution passes over a divider top its velocity quickens and fewer loose solids are carried with it. Thus, the invention may be practiced with more intermediate compartments if it is desired to repeat this effect.

Figure 2:
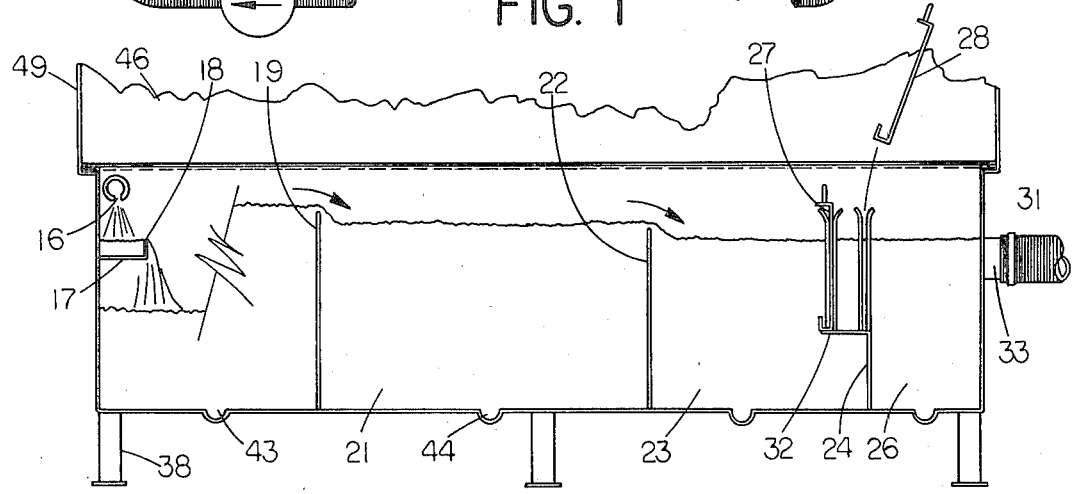
FIG. 2 is a front cross-sectional view taken along line 2—2 of FIG. 1, and a broken view of the cover in open position also diagrammatically depicting two stages of initial operation.
Figure 3:
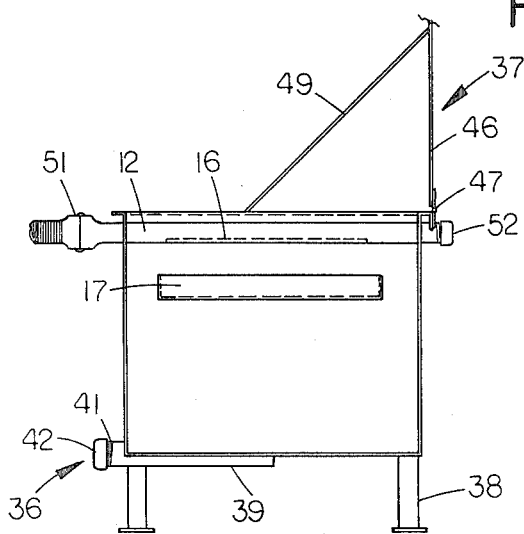
FIG. 3 is a side elevational cross-sectional view taken along lines 3—3 of FIG. 1.
Figure 4:
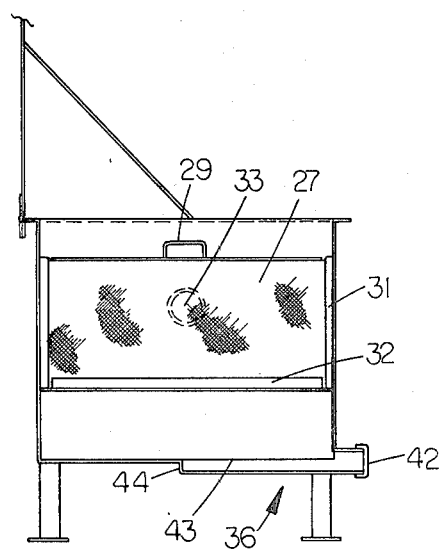
FIG. 4 is a side elevational cross-sectional view taken along lines 4—4 of FIG. 1.

From intermediate compartment 21 the solution flows over divider 22 into compartment 23 where it accumulates until it flows over inverted-L divider 24 into final compartment 26 as more clearly shown on FIG. 2. The top of divider 22 is lower than the top of divider 19 in order that gravity will move the solution through the system back into the dipping vat. Compartments 23 and 26 provide a place for additional contaminants to settle. As the solution moves over divider 24 it must pass through either or both removable screen(s) 27 and 28. The mesh size of screens 27 and 28 permit either screen to catch substantially all animal hair contained in any solution which passes through them. By pulling upwards on handle 29 of either screen it will slide out of tracks 31 (See FIG. 2). The U-shaped bottom 32 of screens 27 and 28 will catch any hair washed or falling downwards as screens 27 or 28 are removed. The screens are alternately removed and accumulated hair is gathered so that one screen is in place to catch animal hair at all times the system is operating.

Finally, the solution exits by gravity from final compartment 26 through outlet port 33 and passes through flexible return pipe 34 back to dipping vat 15. For the system to continue functioning by gravity at this stage, outlet port 33 must be lower than the top of divider 22.

Other features of the system not described above are a clean-out pipe assembly 36 in each compartment, hinged cover assembly 37, and elevating legs 38. In this embodiment the clean-out pipe assemblies 36 are comprised of a pipe 39 sliced horizontally and longitudinally to a neck 41 which fits on the outside front of each compartment. Neck 41 is threaded so that internally threaded cap 42 may be removably affixed thereto. Slot 43 is cut along the bottom of each compartment of a size and shape to accomodate the securement of horizontally sliced opening of pipe 39 and also to include a tab 44 to cover the half circle opening on the end of pipe 39 distal the threaded neck 41. To use clean-out assemblies 36 the system is first shut down, pump 14 and flexible suction pipe 13 are used to return the substantially uncontaminated solution from each compartment to vat 15, solids are then scooped from each compartment until the compartments are substantially clean, caps 42 are removed, and finally each compartment is flushed clean through its open clean-out pipe 39.

Hinged cover assembly 37 is comprised of cover 46 which is attached by hinges 47 to the rear wall of tank 10, handles 48 near the front edge of cover 46 and on its top, and stand-up rods 49. The cover assembly 37 may be closed when an operator is not present to prevent tampering by children or others unaware of the presence of chemicals, and to protect the tank from rainwater and dust.

There are six elevating legs 38 in this embodiment, one in each of the four corners and two intermediate front and back. The legs both provide clearance for the clean-out assemblies 36 and raise the tank to a convenient operating level.

In addition, this embodiment has a quick coupler 51 on the inlet end of inlet pipe 12 and a removable clean-out cap 52 distal the inlet end of inlet pipe 12.

Obviously, numerous modifications and variations of the present invention are possible in light of the above description and the accompanying drawings. It is therefore to be understood that within the scope of the appended claims, the invention may be practiced otherwise than as specifically described therein.

I claim:

1. A device for continuously cleaning livestock dipping vat solution, comprising:
   a dipping vat;
   a device having one or more means for dividing it into two or more settling compartments, the top of each said dividing means being horizontal and lower in elevation than the lowermost part of the walls of the tank and the preceding such dividing means;
   means for transferring contaminated solution from the dipping vat into the tank, including;
   an inlet pipe into the compartment formed by the highest dividing means;
   a flexible, removable hose connected between the dipping vat and the inlet pipes; and
   means for pumping said solution through said inlet pipe from the dipping vat into the tank, whereby the transferring means can be used to return solution from each compartment to the dipping vat when the device is not in its continuous mode;
   a gravity pipe connected between the tank and the dipping vat for returning a top-most portion of the solution from the compartment of the tank formed by the lowest dividing means to the dipping vat; and
   at least two operably removable screens for trapping animal hair dividing the compartment formed by the lowest dividing means into sections and extending above the uppermost level of the solution in said compartment.

2. The device of claim 1 wherein said screens are further characterized as not extending to the bottom of the tank and further comprising a horizontal wall extending between the bottom of said screens and a vertical wall extending from the lower side of the horizontal wall to the bottom of the tank, whereby solids settling in the tank will not clog said screens.

3. The device of claim 1 further comprising:
   legs elevating the tank above ground level; and
   means for flushing solids from each compartment after the solution is removed.

4. The device of claim 1 wherein said inlet pipe is further characterized as being horizontal, elongated, and located near the top of the tank and as having an elongated opening on its underside, and further comprising:
   an elongated horizontal deflector pan having short vertical walls located beneath the opening of said inlet pipe and lower in elevation with respect to the highest dividing means.

* * * * *